(12) United States Patent
Yasue

(10) Patent No.: US 6,459,330 B2
(45) Date of Patent: Oct. 1, 2002

(54) DC-DC VOLTAGE BOOSTING METHOD AND POWER SUPPLY CIRCUIT USING THE SAME

(75) Inventor: Tadashi Yasue, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/768,776

(22) Filed: Jan. 23, 2001

(30) Foreign Application Priority Data

Jan. 25, 2000 (JP) ........................................ 2000-016171

(51) Int. Cl.[7] .................................................. G05F 1/10
(52) U.S. Cl. ........................ 327/538; 327/121; 327/544; 345/212
(58) Field of Search ..................... 363/59, 60; 327/538, 327/119, 121, 544, 589, 157, 158; 345/212

(56) References Cited

U.S. PATENT DOCUMENTS 5,267,211 A * 11/1993 Kobayashi et al. ......... 365/228
5,574,634 A    11/1996 Parlour et al.
5,587,683 A    12/1996 Kawasaki et al.

FOREIGN PATENT DOCUMENTS

| EP | 0 350 462 A2 | 1/1990 |
|---|---|---|
| EP | 0 808 014 A2 | 11/1997 |
| FR | 2 724 468 | 3/1996 |
| JP | 64-39263 | 2/1989 |
| JP | 2-179264 | 7/1990 |
| JP | 3-156511 | 7/1991 |
| JP | 4-162560 | 6/1992 |
| JP | 5-64429 | 3/1993 |
| JP | 7-160215 | 6/1995 |
| JP | 10-319368 | 12/1998 |
| WO | WO 98/27477 | 6/1998 |

* cited by examiner

Primary Examiner—Shawn Riley
(74) Attorney, Agent, or Firm—Mark P. Watson

(57) ABSTRACT

A DC-DC voltage boosting method is capable of reducing power consumption by detecting a margin of a boosting voltage, even if the display mode of a liquid crystal panel or a displayed content changes. Included are the steps of (a) boosting an input voltage by using clock signals to generate a boosted voltage, (b) generating a stabilized operating voltage by using the boosted voltage, (c) detecting a margin voltage between the boosted voltage and the operating voltage, and (d) based on the detected result in step (c), adjusting the frequency of the clock signals used in step (a) or fixing at least one of the clock signals which control switching components.

10 Claims, 11 Drawing Sheets

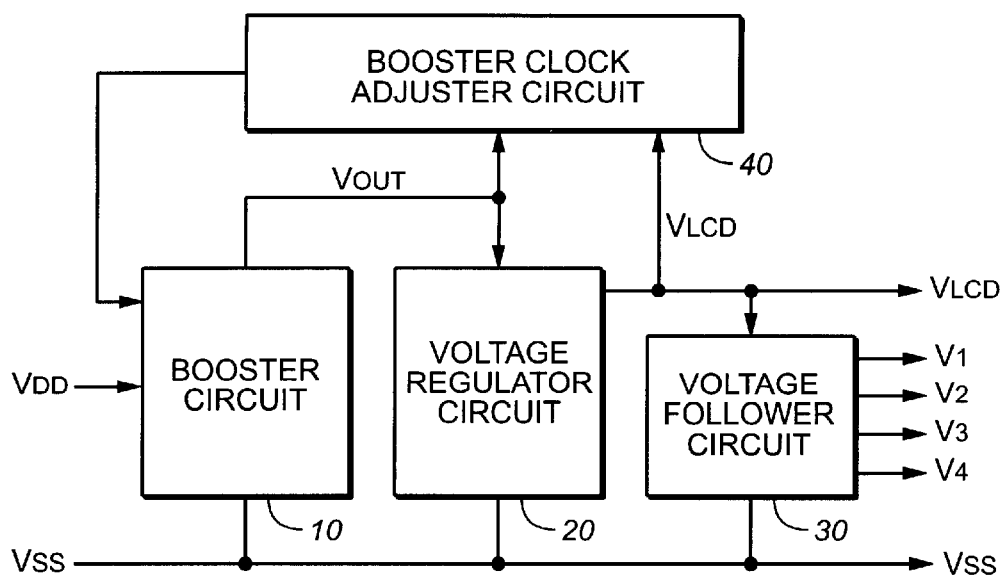
FIG._1
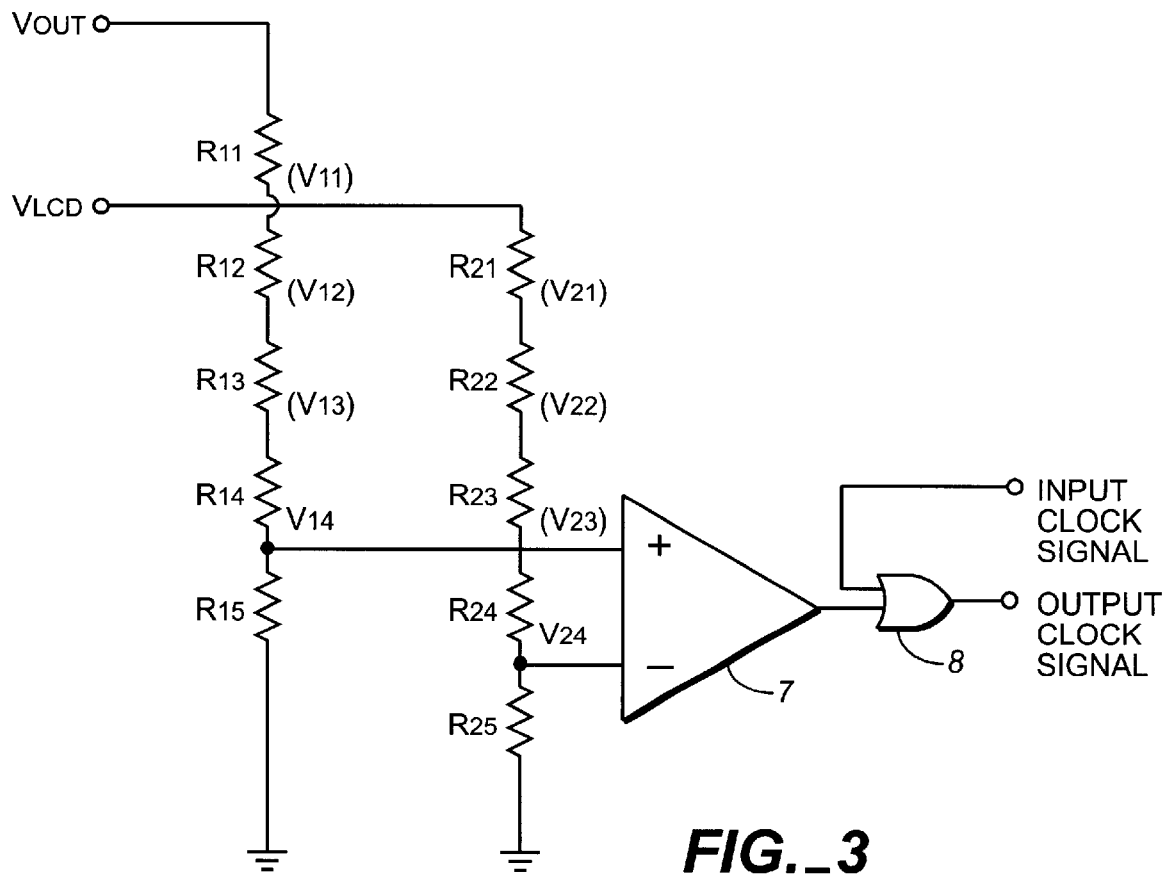
FIG._3

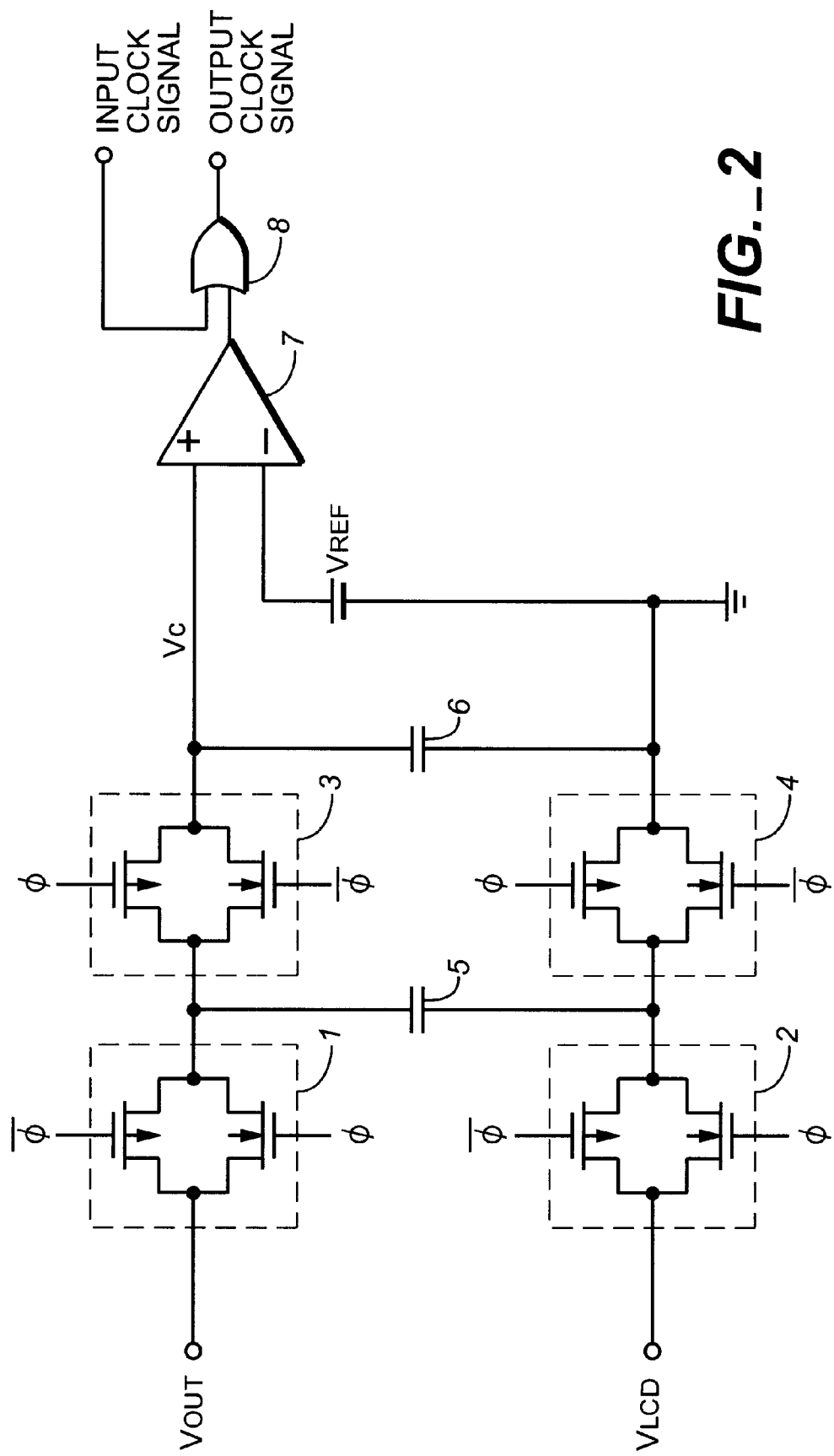
FIG._2

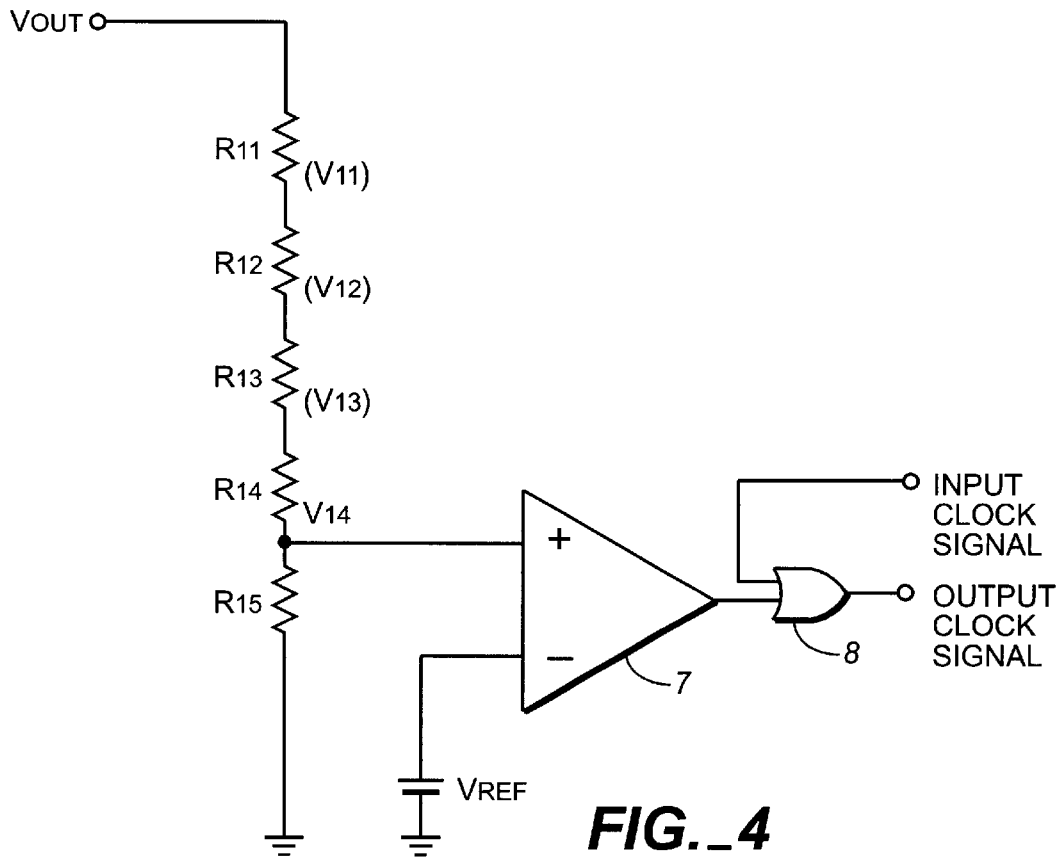
*FIG._4*
| A | B | CONTROL OPERATION |
|---|---|---|
| 1 | 1 | The boosting ratio is decremented by one level. |
| 1 | 0 | |
| 0 | 1 | The booster clock frequency is decremented by one level. |
| 0 | 0 | The booster clock frequency is incremented by one level.<br>If the booster clock frequency is at the maximum, the boosting ratio is incremented by one level. |
*FIG._6*

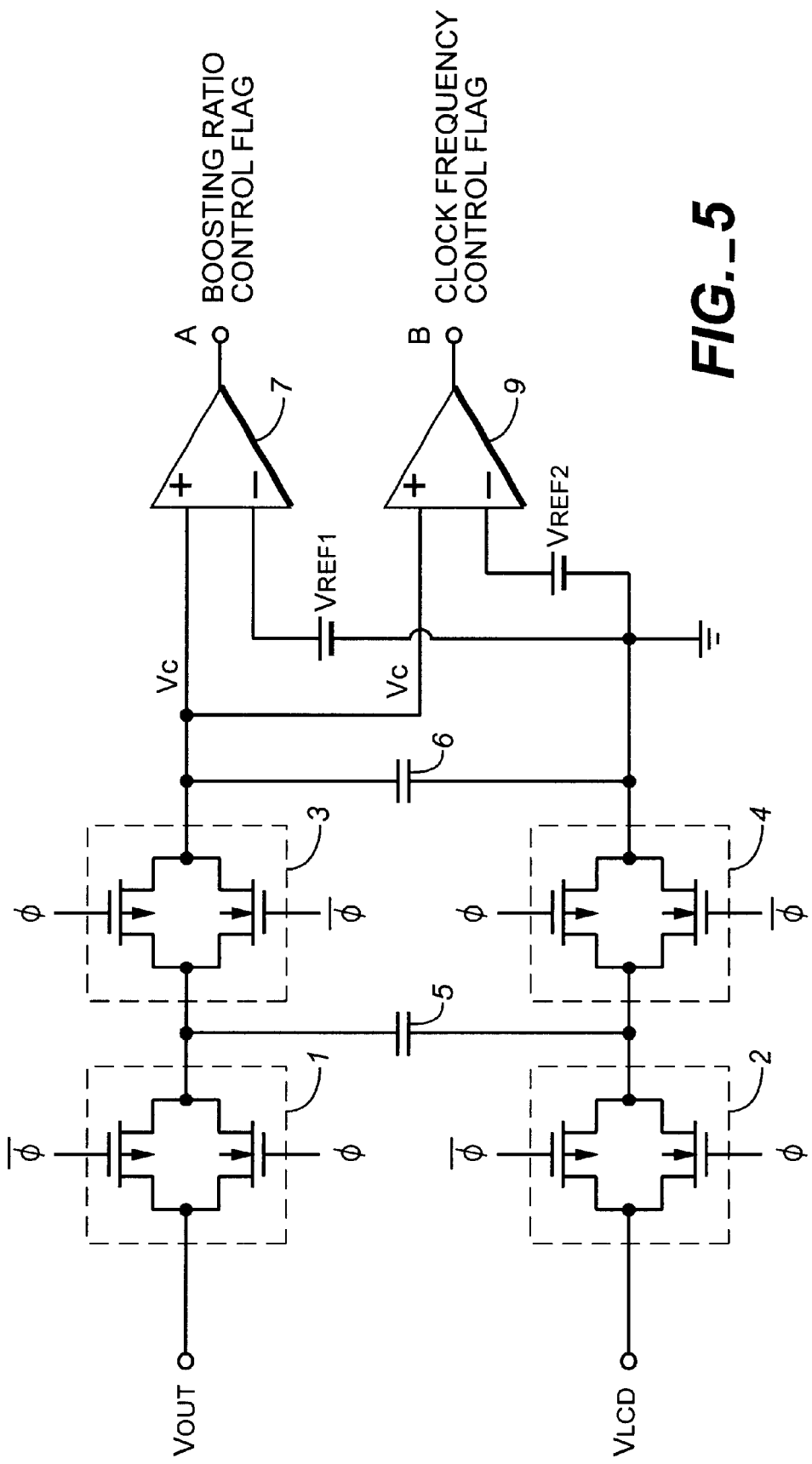
FIG._5

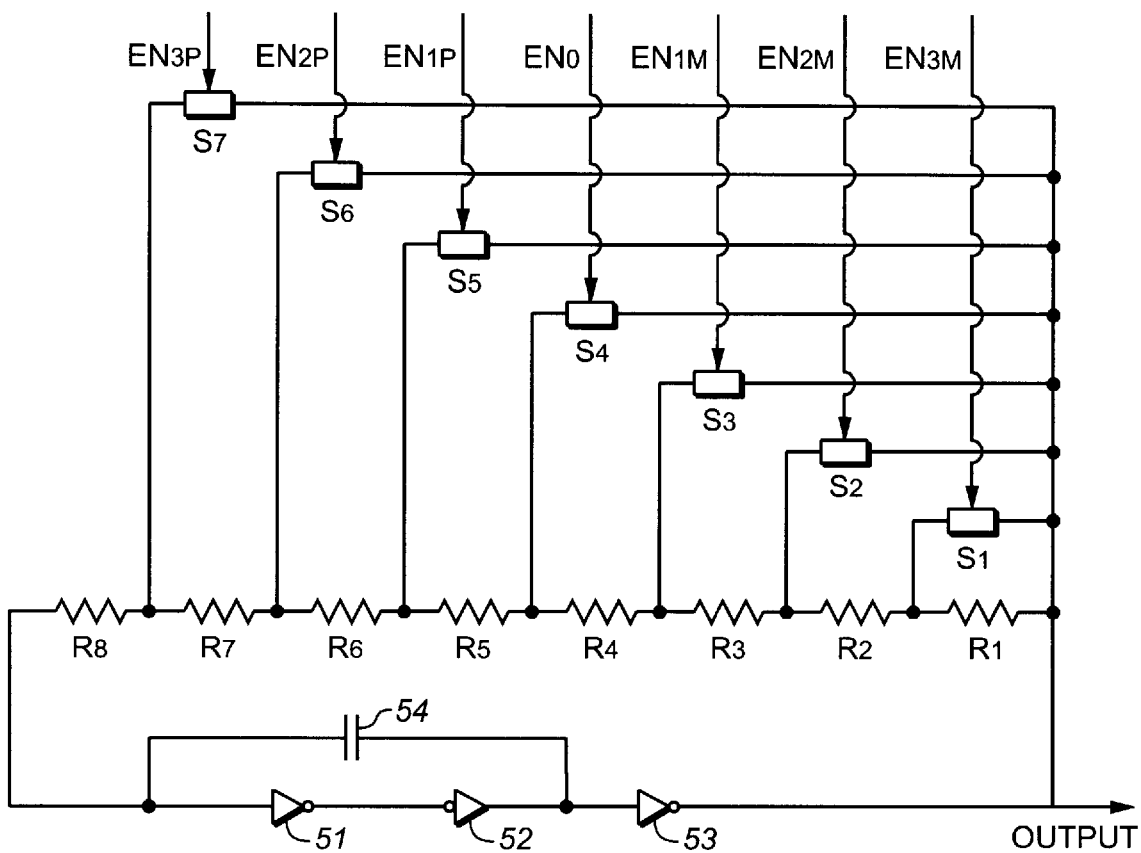
FIG._7
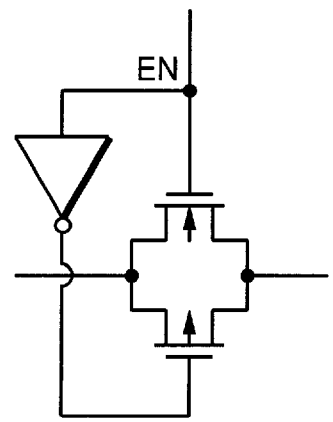
FIG._8

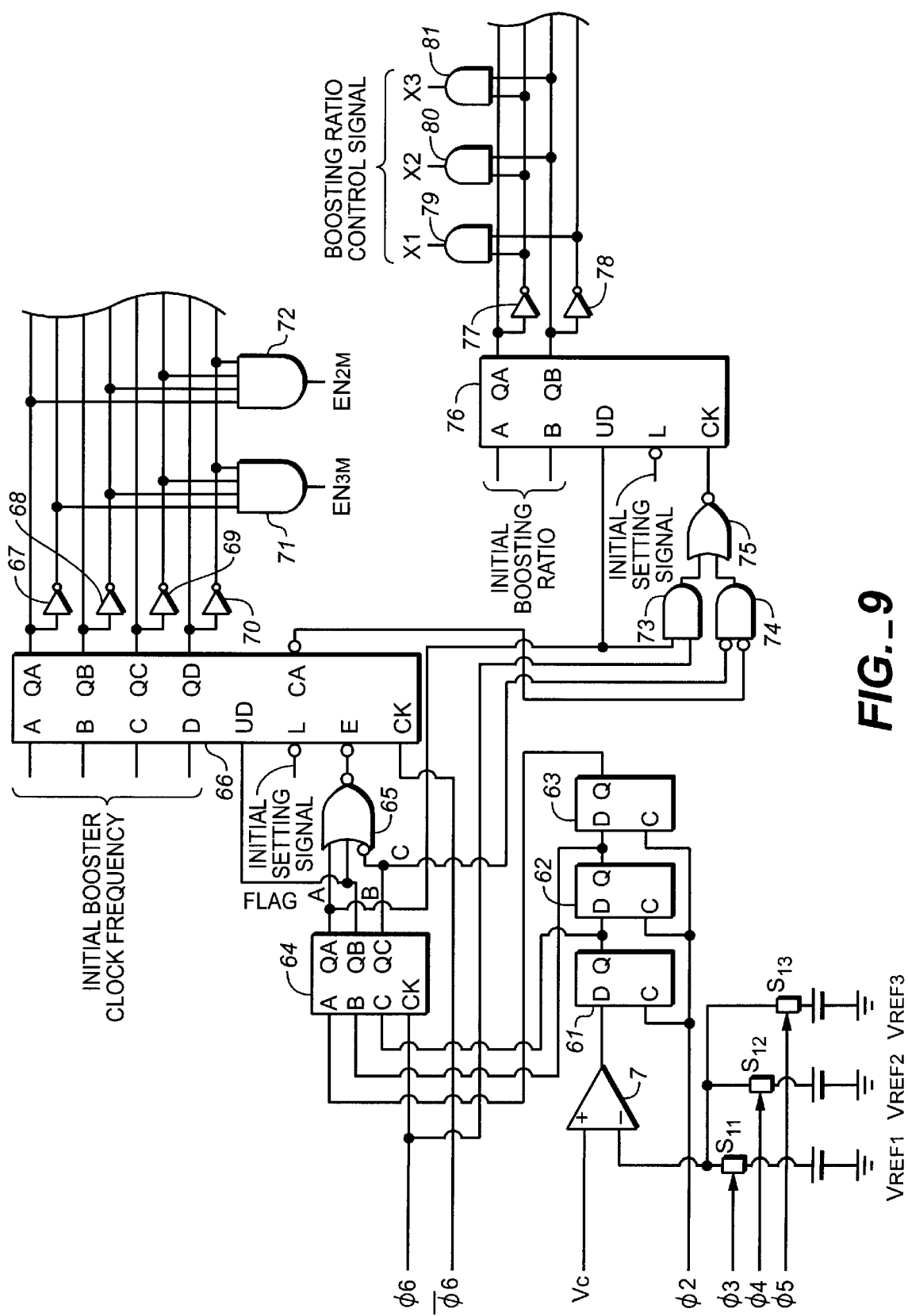
FIG._9

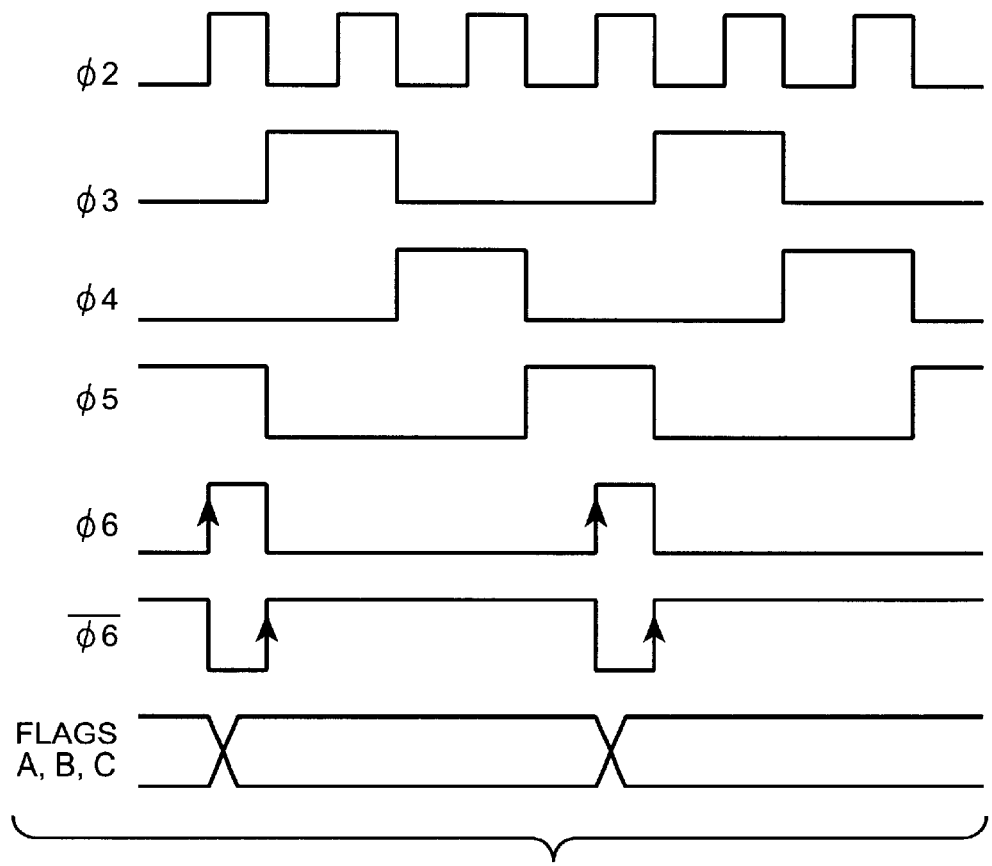
FIG._10
| A | B | C | CONTROL OPERATION |
|---|---|---|---|
| 1 | 1 | 1 | The boosting ratio is decremented by one level. |
| 0 | 1 | 1 | The booster clock frequency is decremented by one level. |
| 0 | 0 | 1 | The current status is maintained. |
| 0 | 0 | 0 | The booster clock frequency is incremented by one level. If the booster clock frequency is at the maximum, the boosting ratio is incremented by one level. |
FIG._11

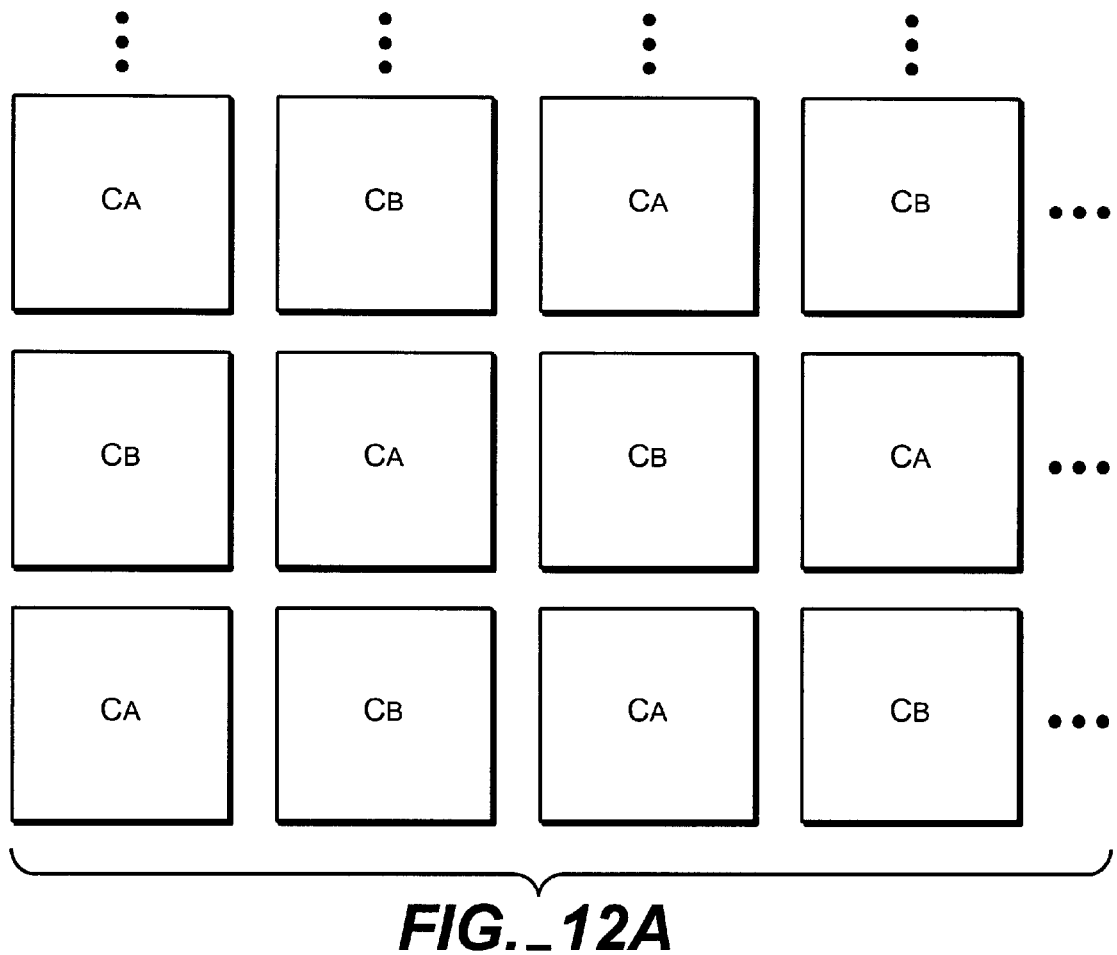
*FIG._12A*
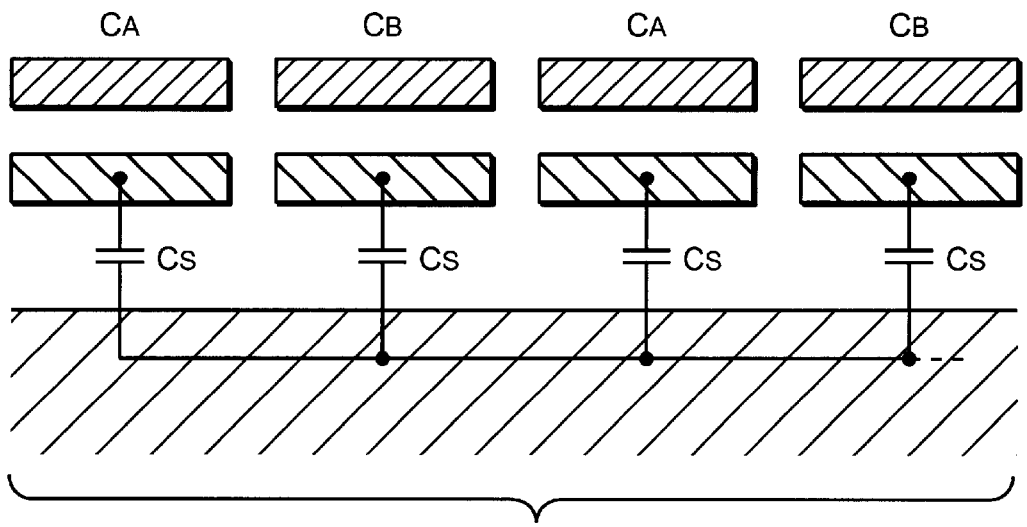
*FIG._12B*

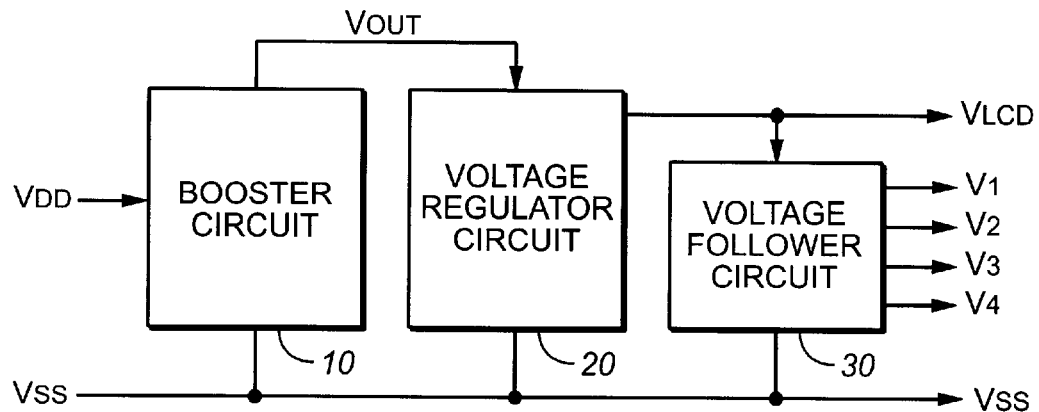
FIG._13
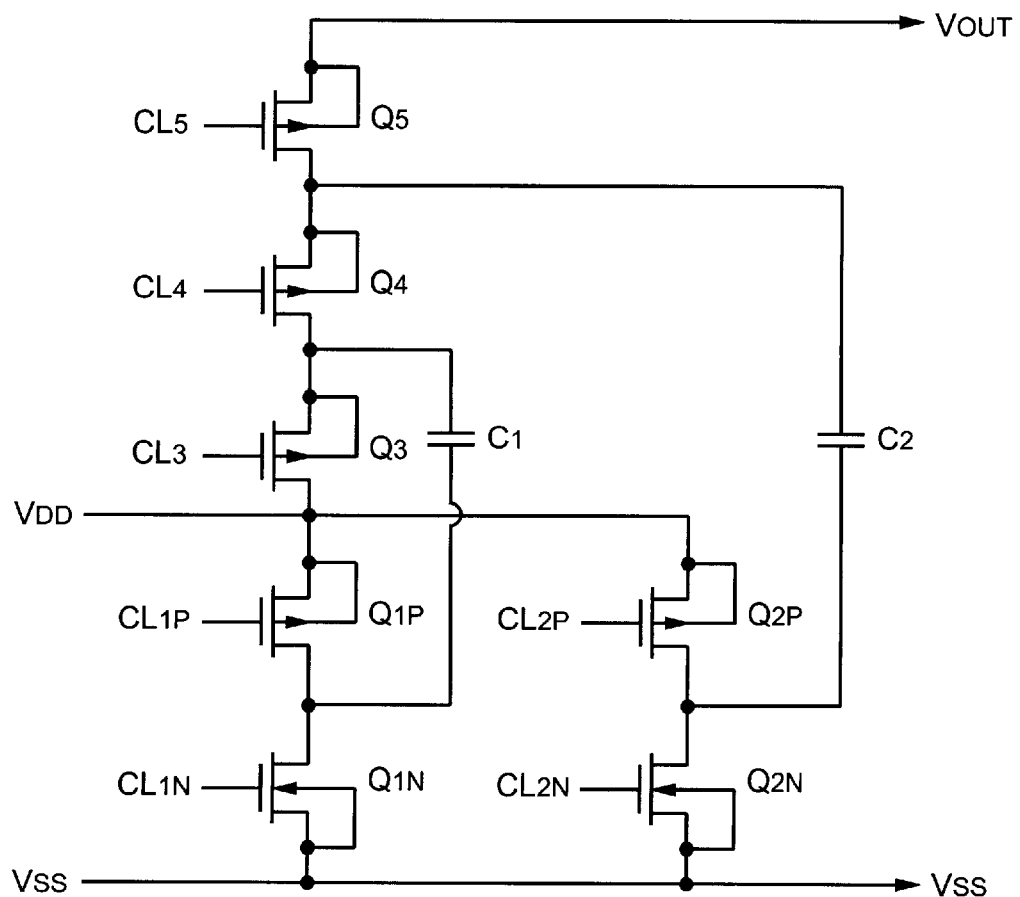
FIG._14

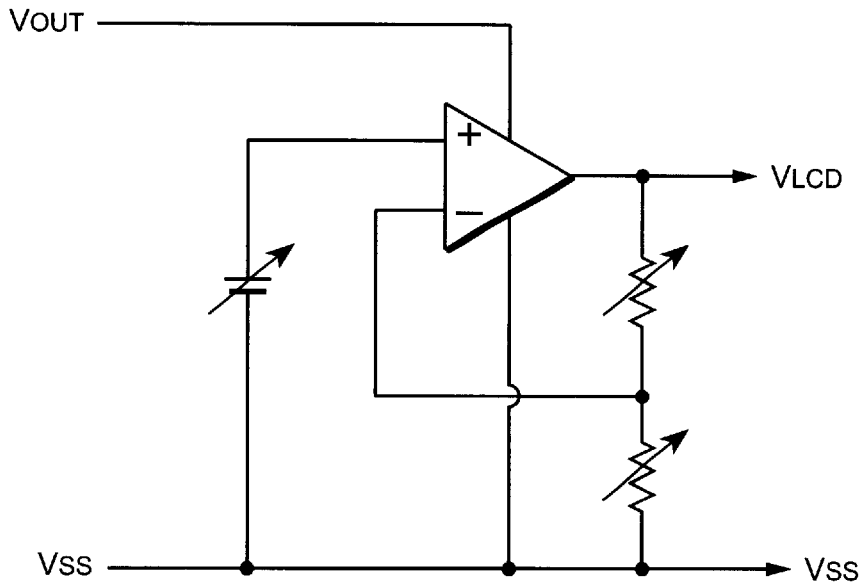
FIG._15
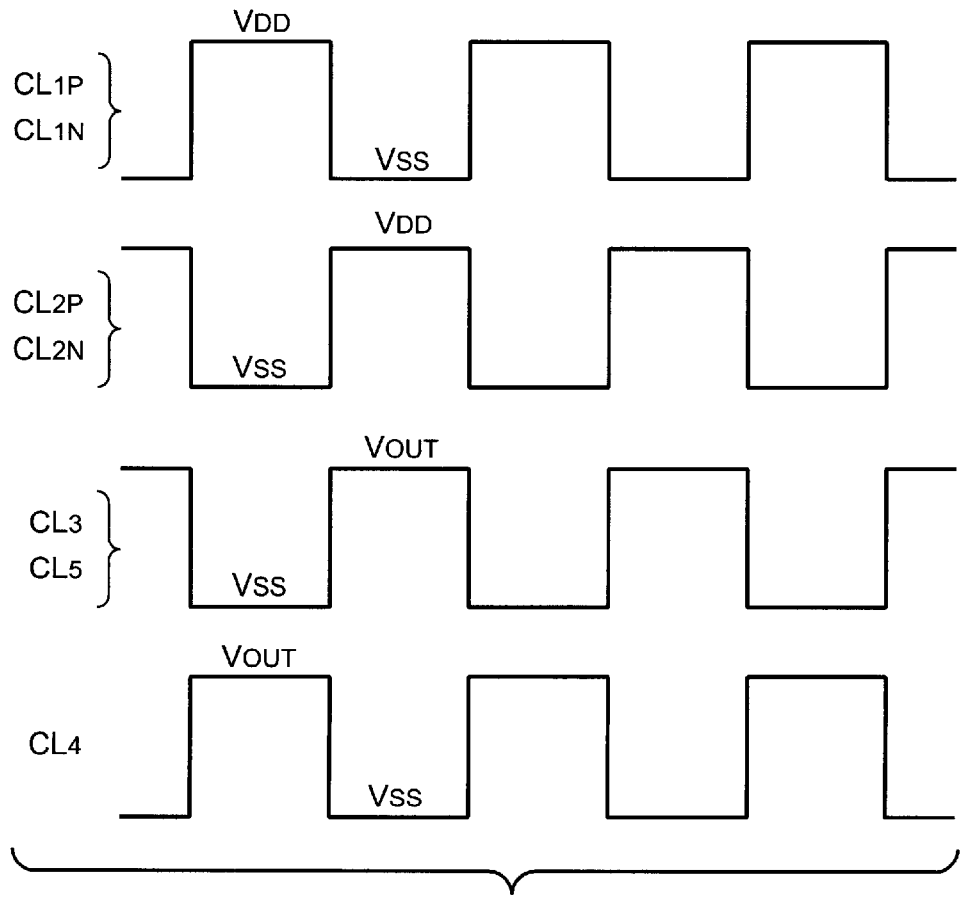
FIG._16

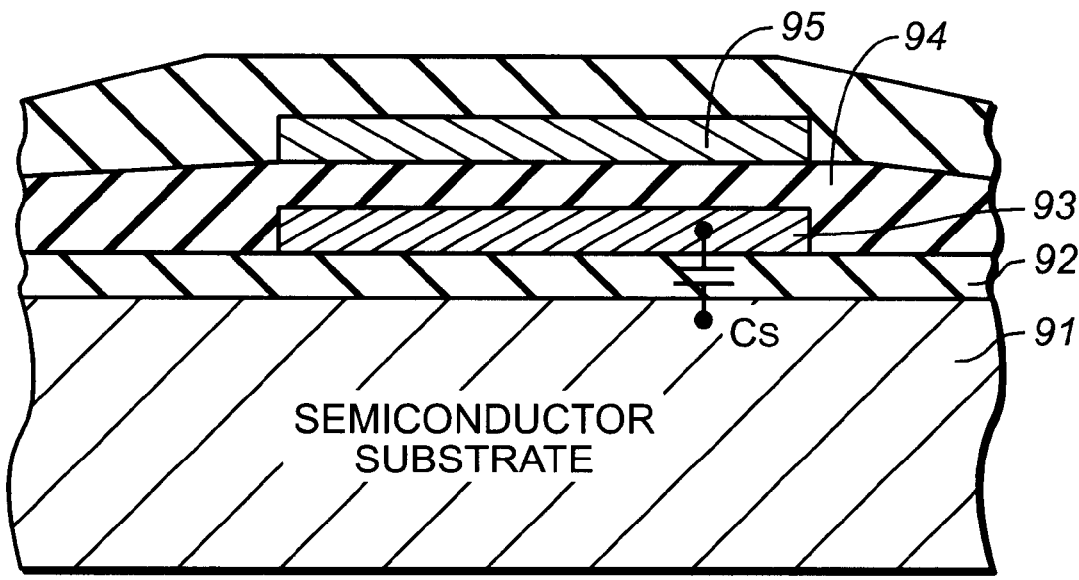
FIG._17A
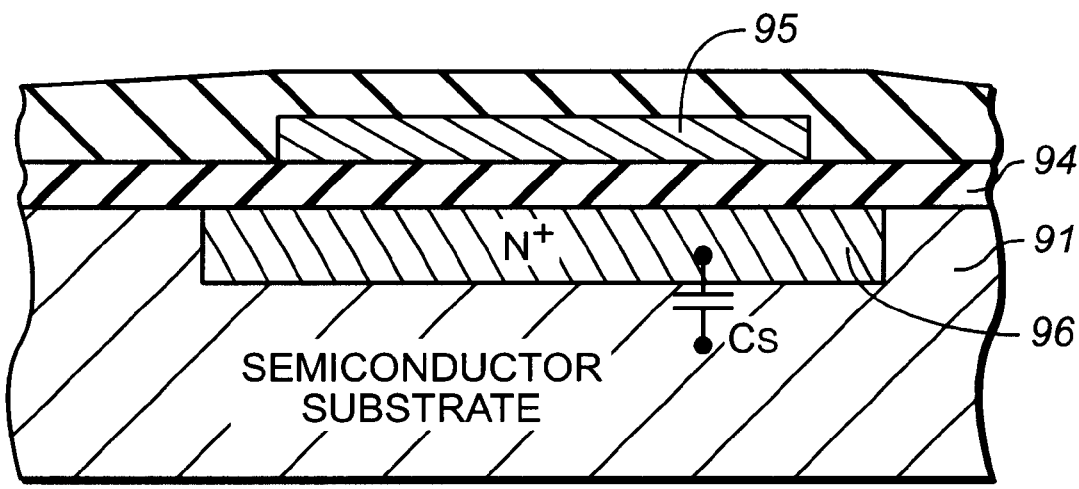
FIG._17B

DC-DC VOLTAGE BOOSTING METHOD AND POWER SUPPLY CIRCUIT USING THE SAME

BACKGROUND OF THE INVENTION

1. Field of the Invention

The present invention relates to a DC-DC voltage boosting method and a power supply using the same. More particularly, the present invention relates to a DC-DC voltage boosting method and a power supply circuit of the charge pump type, which are incorporated in a voltage-boost power supply circuit for driving a liquid crystal device, or in a driver IC containing a power supply for driving a liquid crystal device.

2. Description of the Related Art

The following discussion provides the background for understanding the problems solved by the present invention. A liquid crystal device requires a high-voltage supply for driving liquid crystals, and the high-voltage power is generally obtained by DC-DC boosting. FIG. 13 shows a configuration of a typical power supply circuit incorporated in a driver IC for driving a liquid crystal device. This IC operates by receiving a power supply voltage $V_{DD}$ at the high potential side and a power supply voltage $V_{SS}$ at low potential side. Referring to FIG. 13, a voltage booster circuit 10 boosts the power supply voltage $V_{DD}$ at high potential side and outputs a boosted voltage $V_{OUT}$. The boosted voltage $V_{OUT}$ is fed to a voltage regulator circuit 20, which outputs an operating voltage $V_{LCD}$ for operating the liquid crystal device. A voltage follower circuit 30 divides and buffers the operating voltage $V_{LCD}$, and outputs voltages V1, V2, V3, and V4, in accordance with loads required for corresponding functions.

FIG. 14 is a circuit diagram showing an example of a configuration of the voltage booster circuit 10, and FIG. 15 shows an example of a configuration of the voltage regulator circuit 20. Referring to FIG. 14, a P-channel transistor $Q_{1P}$ and an N-channel transistor $Q_{1N}$ are connected in series between the supply voltage $V_{DD}$ at the high potential side and the power supply voltage $V_{SS}$ at the low potential side. In parallel to the P-channel transistor $Q_{1P}$ and the N-channel transistor $Q_{1N}$, a P-channel transistor $Q_{2P}$ and an N-channel transistor $Q_{2N}$ are connected in series. P-channel transistors $Q_3$, $Q_4$, and $Q_5$ are connected in series to the power supply voltage $V_{DD}$ at high potential side.

A capacitor $C_1$ is connected between the source of the transistor $Q_3$ and the drain of both the transistors $Q_{1P}$ and $Q_{1N}$, and a capacitor $C_2$ is connected between the source of the transistor $Q_4$ and the drain of both the transistors $Q_{2P}$ and $Q_{2N}$. The boosted voltage $V_{OUT}$ is obtained from the source of the transistor $Q_5$.

FIG. 16 is a schematic representation showing wave formations of clock signals which are input to the voltage booster circuit shown in FIG. 14, in the case where the input voltage is tripled. A clock signal $CL_{1P}$ input to the gate of the transistor $Q_{1P}$ and a clock signal $CL_{1N}$ input to the gate of the transistor $Q_{1N}$ are the same. A clock signal $CL_{2P}$ input to the gate of the transistor $Q_{2P}$ and a clock signal $CL_{2N}$ input to the gate of the transistor $Q_{2N}$ are the opposition of the clock signal of $CL_{1P}$ and $CL_{1N}$. The clock signals $CL_{1P}$, $CL_{1N}$, $CL_{2P}$, and $CL_{2N}$ alternate between the power supply voltages $V_{DD}$ and $V_{SS}$.

A clock signal $CL_3$ input to the gate of the transistor $Q_3$ and a clock signal $CL_5$ input to the gate of the transistor $Q_5$ are the opposition of the clock signal of $CL_{1P}$ and $CL_{1N}$. A clock signal $CL_4$ input to the gate of the transistor $Q_4$ is the opposition of the clock signal of $CL_{2P}$ and $CL_{2N}$. The clock signals $CL_3$, $CL_4$, and $CL_5$ alternate between the boosted voltage $V_{OUT}$ and the power supply voltage $V_{SS}$.

When the booster is used to double the input voltage, the clock signals $CL_{2P}$ and $CL_{2N}$ are fixed to the supply voltage $V_{DD}$, while the clock signal CL5 is fixed to the supply voltage $V_{SS}$.

When a driver IC for driving liquid crystals is of the chip-on-glass (COG) type so that the driver IC is mounted on a glass substrate, it is necessary to reduce electric terminals which connect a printed circuit substrate and a liquid crystal display device. Accordingly, the driver IC for driving liquid crystals is required to contain a charge pump capacitor for boosting a voltage.

From the viewpoint of reliability and costs, however, it is difficult to load the driver IC with large capacitors. An ability of a voltage-boost power supply to supply electric current depends on capacitance of capacitors and a frequency of switching. Therefore, switching with high frequency is required to obtain sufficient ability of the voltage-boost power supply to supply electric current.

Capacitors contained in ICs, however, always include stray capacitance. When the switching frequency increases, a reactive current due to charging and discharging of the stray capacitance also increases. FIG. 17 shows the stray capacitance.

Referring to FIG. 17(a), a lower electrode 93 of a capacitor is formed over a semiconductor substrate 91 via an insulator film 92, and an upper electrode 95 of the capacitor is formed above the lower electrode 93 via a dielectric material 94. Accordingly, the lower electrode 93 and the semiconductor substrate 91 carry stray capacitance $C_S$ between them.

Referring to FIG. 17(b), an N⁺ region 96 is formed in the semiconductor substrate 91 so as to be the lower electrode of the capacitor, and the upper electrode 95 is formed above the lower electrode 96 via the dielectric material 94. Accordingly, the lower electrode 96 and the semiconductor substrate 91 carry the stray capacitance $C_S$ between them.

Capacitors contained in an IC must be configured such that the stray capacitance is small, and the switching frequency must be adjusted to a necessary and sufficient value.

With regard to methods for adjusting the switching frequency, the methods disclosed in Japanese Unexamined Patent Application Publication Nos. 4-162560, 5-64429, and 7-160215 are known in the art. When a load current of the voltage-boost power supply is $I_{OUT}$, however, a current which flows through the power supply voltage $V_{DD}$ is approximately the product of $I_{OUT}$ and a boosting ratio. Thus, to reduce power consumption, the boosting ratio must be set to a minimum value which satisfies the condition that the boosted voltage $V_{OUT}$ is larger than the operating voltage $V_{LCD}$.

The boosted voltage $V_{OUT}$ varies with the output impedance and the load current $I_{OUT}$ of the voltage-boost power supply. The output impedance varies with the capacities of capacitors and the switching frequency. Since capacitors contained in an IC are small and the switching frequency is preferably low, the output impedance of the voltage-boost power supply tends to be large. The load current $I_{OUT}$ is determined primarily by a current charged and discharged by the liquid crystal panel, and the current charged and discharged by a liquid crystal panel varies with a display mode and display contents.

Since the boosted voltage $V_{OUT}$ varies significantly with the display mode and display contents, the boosting ratio must be adjusted to a minimum value required for the corresponding display mode and display contents. According to above-described Japanese Unexamined Patent Application Publications, however, only an adjustment of the switching frequency is provided and an adjustment of the boosting ratio is not considered. The adjustment of the boosting ratio may be achieved with software control using a microprocessor unit (MPU). In such a case, however, only an adjustment in accordance with the display mode is possible, and an adjustment in accordance with the display contents cannot be achieved.

Recently, the display capacity of liquid crystal panels has been increasing, and thus the power consumption of a driver IC for driving liquid crystals has tended to increase. An increase of power consumption, however, is not acceptable even when the display capacity is large, especially with portable devices. For such devices, the power consumption is decreased as much as possible by controlling the display mode.

OBJECTS OF THE INVENTION

In view of the above, an object of the present invention is to provide a DC-DC voltage boosting method and a booster circuit which are capable of cutting down the power consumption even when the display mode or the display content is changed, by detecting a margin of the boosted voltage.

Another object of the present invention is to provide a layout configuration which provides a low stray capacity and is suitable for an internal switching capacitor of an IC.

SUMMARY OF THE INVENTION

In order to solve the above-described problems, a DC-DC voltage boosting method according to a first aspect of the present invention provides the steps of (a) boosting an input voltage by using clock signals to generate a boosted voltage, (b) comparing the boosted voltage to at least one predetermined voltage, and (c) based on the comparison result in step (b), adjusting the frequency of the clock signals used in step (a) or fixing at least one of the clock signals which control switching components.

A power supply circuit according to a first aspect of the present invention includes a booster circuit to which an input voltage is supplied and which boosts the input voltage by using clock signals to generate a boosted voltage, a comparator circuit for comparing the boosted voltage generated by the booster circuit to at least one predetermined voltage, and a booster clock adjuster circuit which, based on the comparison result from the comparator circuit, adjusts the frequency of the clock signals used by the booster circuit or fixes at least one of the clock signals which control switching components.

A DC-DC voltage boosting method according to a second aspect of the present invention includes the steps of (a) boosting an input voltage by using clock signals to generate a boosted voltage, (b) generating a stabilized operating voltage by using the boosted voltage, (c) detecting a margin voltage between the boosted voltage and the operating voltage, and (d) based on the detected result in step (c), adjusting the frequency of the clock signals used in step (a) or fixing at least one of the clock signals which control switching components.

A power supply circuit according to a second aspect of the present invention includes a booster circuit to which an input voltage is supplied and which boosts the input voltage by using clock signals to generate a boosted voltage, a voltage regulator circuit which generates a stabilized operating voltage by using the boosted voltage generated by the booster circuit, a detector circuit for detecting a margin voltage between the boosted voltage generated by the booster circuit and the operating voltage generated by the voltage regulator circuit, and a booster clock adjuster circuit which, based on the detected result of the detector circuit, adjusts the frequency of the clock signals used by the booster circuit or fixes at least one of the clock signals which control switching components.

The boosting ratio of the input voltage may be changed by fixing at least one of the clock signals which control switching components.

The margin voltage may be compared to a first predetermined voltage and a second predetermined voltage. When the margin voltage is higher than the first predetermined voltage, the boosting ratio may be brought down by one level. When the margin voltage is lower than the first predetermined voltage and higher than the second predetermined voltage, the frequency of the clock signals may be brought down by one level. When the margin voltage is lower than the second predetermined voltage the frequency of the clock signals may be brought up by one level or the boosting ratio may be brought up by one level.

The margin voltage may be compared to first, second and third predetermined voltages. When the margin voltage is higher than the first predetermined voltage, the boosting ratio is brought down by one level. When the margin voltage is lower than the first predetermined voltage and higher than the second predetermined voltage, the frequency of the clock signals may be brought down by one level. When the margin voltage is lower than the second predetermined voltage and higher than the third predetermined voltage, the boosting ratio and the frequency of the clock signals may be maintained. When the margin voltage is lower than the third predetermined voltage, the frequency of the clock signals or the boosting ratio may be brought up by one level.

For the above-described power supply circuit, a booster clock generator circuit for generating and supplying to the booster circuit variable frequency clock signals may further be provided. The booster clock generation circuit may include a capacitor, a plurality of resistors, and a plurality of switch circuits which change the connections of the plurality of resistors corresponding to a plurality of control signals output from the booster clock adjuster circuit.

Furthermore, in the above-described power supply circuit, at least one capacitor whose the upper electrode and the lower electrode are impressed with signals in a first phase and at least one capacitor whose the upper electrode and the lower electrode are impressed with signals in a second phase which is the opposite phase of the first phase may be included in the booster circuit and may be arranged in M-by-N checkered manner (M and N are natural numbers).

The present invention having the above-described configuration is capable of reducing the power consumption even when the display mode or display content of the liquid crystal panel is changed, by detecting the margin of the boosted voltage and by adjusting the frequency of the clock signals or fixing at least one of the clock signals which control switching components.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1 is a block diagram of a power supply circuit according to a first embodiment of the present invention;

FIG. 2 is a circuit diagram showing an example of the configuration of a booster clock adjuster circuit in the power supply circuit according to the first embodiment of the present invention;

FIG. 3 is a circuit diagram showing another example of the configuration of the booster clock adjuster circuit in the power supply circuit according to the first embodiment of the present invention;

FIG. 4 is a circuit diagram showing still another example of the configuration of the booster clock adjuster circuit in the power supply circuit according to the first embodiment of the present invention;

FIG. 5 is a circuit diagram showing an example of the configuration of a booster clock adjuster circuit in a power supply circuit according to a second embodiment of the present invention;

FIG. 6 is a table showing the control operations of the power supply circuit according the second embodiment of the present invention;

FIG. 7 is a circuit diagram showing an example of the configuration of a booster clock generator circuit in the power supply circuit according to the second embodiment of the present invention;

FIG. 8 is a circuit diagram showing an example of the configuration of a switching circuit in the booster clock generator circuit of FIG. 7;

FIG. 9 is a circuit diagram showing an example of the configuration of a booster clock adjuster circuit in a power supply circuit according to a third embodiment of the present invention;

FIG. 10 is a diagram illustrating the waveforms of control clock signals fed to the booster clock adjuster circuit of FIG. 9;

FIG. 11 is a table showing the control operations of the power supply circuit according to the third embodiment of the present invention;

FIGS. 12A and 12B are illustrations showing the configuration of capacitors in a power supply circuit according to one embodiment of the present invention;

FIG. 13 is a block diagram of a typical power supply circuit in a liquid crystal driver IC;

FIG. 14 is a circuit diagram showing an example of the configuration of a booster circuit in the power supply circuit of FIG. 13;

FIG. 15 is a circuit diagram showing an example of the configuration of a voltage regulator circuit in the power supply circuit of FIG. 13;

FIG. 16 is a diagram illustrating the waveforms of clock signals fed to the booster circuit of FIG. 14 when an input voltage is being tripled; and FIGS. 17A and 17B each illustrate a stray capacitance incidental to a capacitor in an IC.

DESCRIPTION OF THE PREFERRED EMBODIMENTS

The embodiments of the present invention will now be described with reference to the drawings. It is to be understood that the similar components are indicated by the same reference numerals in different drawings and duplicate descriptions thereof are omitted.

A power supply circuit according to a first embodiment of the present invention has the overall configuration shown in FIG. 1. A power supply voltage $V_{DD}$ at a high potential side and power supply voltage $V_{SS}$ at a low potential side are fed to this power supply circuit for operation. One of these power supply voltages may be ground potential. In this embodiment, the power supply voltage $V_{SS}$ at the low potential side is set to be equal to earth potential.

In FIG. 1, a booster circuit 10 boosts the power supply voltage $V_{DD}$ at the high potential side and outputs a boosted voltage $V_{OUT}$. A voltage regulator circuit 20 to which the boosted voltage $V_{OUT}$ is supplied generates an operating voltage $V_{LCD}$ for liquid crystal display device. A voltage follower circuit 30 divides and buffers the operating voltage $V_{LCD}$ and outputs various voltages $V_1$, $V_2$, $V_3$ and $V_4$ corresponding to the load required for each function. The booster circuit 10 and the voltage regulator circuit 20 may have the same configuration and operation as those shown in FIG. 14 and FIG. 15, respectively, as described in the background section (Description of the Related Art) of this specification. When the booster circuit shown in FIG. 14 carries out triple boosting, booster clock signals shown in FIG. 16 may be used. When the operating voltage $V_{LCD}$ and the boosted voltage $V_{OUT}$ are set to be equal, there is no need for the voltage regulator circuit 20.

As shown in FIG. 1, the power supply circuit of this embodiment further includes a booster clock adjuster circuit 40. To the booster clock adjuster circuit 40, the boosted voltage $V_{OUT}$ from the booster circuit 10 and the operating voltage $V_{LCD}$ from the voltage regulator circuit 20 are supplied. These voltages are compared so that various adjustments such as gating the booster clock signals supplied to the booster circuit or changing the frequency thereof can be carried out. Thus, the boosting operation of the booster circuit 10 can be controlled. When the operating voltage $V_{LCD}$ is set to be equal to the boosted voltage $V_{OUT}$, the booster clock adjuster circuit 40 adjusts the booster clock signals based only on the boosted voltage $V_{OUT}$.

FIG. 2 shows a configuration example of the booster clock adjuster circuit 40. As shown in FIG. 2, the booster clock adjuster circuit includes switching circuits 1 to 4 each having a P-channel transistor and an N-channel transistor. The switching circuits 1 to 4 are opened/closed in response to control clock signals φ and barred φ which are reverse in phase. For example, the switching circuit 1 is closed when the control clock signal φ is at high level and the control clock signal barred φ is at low level, and is opened when the control clock signal φ is at low level and the control clock signal barred φ is at high level.

A potential difference (actual margin voltage) between the boosted voltage $V_{OUT}$ and the operating voltage $V_{LCD}$ is supplied to a capacitor 5 when the switching circuits 1 and 2 are closed and when the switching circuits 3 and 4 are opened. A potential difference between the both ends of the capacitor 5 is supplied to a capacitor 6 when the switching circuits 3 and 4 are closed and the switching circuits 1 and 2 are opened. A potential difference $V_c$ between the both ends of the capacitor 6 is applied to a comparator 7. The comparator 7 compares this potential difference $V_C$ with a predetermined voltage $V_{REF}$ to output a comparison result to at least one gate circuit 8. It will be noted that an A/D converter may be used as a circuit for comparing these voltages, instead of the comparator 7.

In the present embodiment, the gate circuit 8 is implemented by an OR circuit. The predetermined voltage $V_{REF}$ is set to be equal to the desired margin voltage between the boosted voltage $V_{OUT}$ and the operating voltage $V_{LCD}$. When the potential difference $V_C$ between the both ends of the capacitor 6 is lower than the predetermined voltage $V_{REF}$, the OR circuit 8 outputs the input booster clock signal. This booster clock signal is supplied, for example, as a booster clock signal $CL_{2P}$ to the gate of the P-channel transistor $Q_{2P}$ in the booster circuit shown in FIG. 14. When the potential difference $V_C$ is higher than the predetermined voltage $V_{REF}$, the OR circuit 8 supplies a high-level signal, rather than the booster clock signal, to the booster circuit. This makes it possible to change the boosting ratio of the booster circuit, so that the potential difference between the boosted voltage $V_{OUT}$ and the operating voltage $V_{LCD}$ may be made closer to the desired margin voltage.

In FIG. 2, the potential difference between the boosted voltage $V_{OUT}$ and the operating voltage $V_{LCD}$ is detected by using the switching circuits 1 to 4, and the capacitors 5 and 6. Furthermore, through use of a voltage divider circuit, as shown in FIG. 3, a divided voltage of the boosted voltage $V_{OUT}$ may be compared with a divided voltage of the operating voltage $V_{LCD}$. Resistors $R_{11}$ to $R_{15}$ are connected to the boosted voltage $V_{OUT}$, and resistors $R_{21}$ to $R_{25}$ are connected to the operating voltage $V_{LCD}$. The comparator 7 compares, for example, divided voltages $V_{14}$ and $V_{24}$ to output a comparison result to at least one gate circuit 8.

Furthermore, as shown in FIG. 4, a divided voltage of the boosted voltage $V_{OUT}$ may also be compared with the predetermined voltage $V_{REF}$. Resistors $R_{11}$ to $R_{15}$ are connected to the boosted voltage $V_{OUT}$. The comparator 7 compares, for example, a divided voltage $V_{14}$ with the predetermined voltage $V_{REF}$ to output a comparison result to at least one gate circuit 8. In this regard, the boosted voltage $V_{OUT}$ may be used as the operating voltage $V_{LCD}$.

The power supply circuit shown in FIG. 2 serves to control the potential difference (actual margin voltage) between the boosted voltage $V_{OUT}$ and the operating voltage $V_{LCD}$ to have a constant value (desired margin voltage). In the power supply circuit shown in FIG. 3, on the other hand, the potential difference between the boosted voltage $V_{OUT}$ and the operating voltage $V_{LCD}$ varies depending upon the values of the boosted voltage $V_{OUT}$ or those of the operating voltage $V_{LCD}$. The power supply circuit shown in FIG. 4 serves to control the boosted voltage $V_{OUT}$ to have a constant value. While the power supply circuit shown in FIG. 3 or 4 is relatively straightforward, a divider circuit containing resistors will provide a somewhat larger chip area and slightly increased power consumption that depends upon an electric current passing through the resistors.

Now, a second embodiment of the present invention is described. The present embodiment employs a booster clock adjuster circuit as shown in FIG. 5. What is different from the first embodiment is that the potential difference $V_C$ between the both ends of the capacitor 6 is applied both to a first comparator 7 and to a second comparator 9. The first comparator 7 compares this potential difference $V_C$ with a first predetermined voltage $V_{REF}1$ to output a comparison result A. In turn, the second comparator 9 compares this potential difference $V_C$ with a second predetermined voltage $V_{REF}2$ to output a comparison result B.

In this embodiment, the second predetermined voltage $V_{REF}2$ is set to be equal to the desired margin voltage between the boosted voltage $V_{OUT}$ and the operating voltage $V_{LCD}$ while the first predetermined voltage $V_{REF}1$ is set at a larger voltage (for example, $V_{DD}-V_{SS}$). The comparison result A is used as a boosting ratio control flag, and the comparison result B is used as a booster clock frequency control flag.

FIG. 6 shows a specific control operation. When the boosting ratio control flag A is at high level 1, the boosting ratio is decremented by one level. When the boosting ratio control flag A is at low level 0 and the booster clock frequency control flag B is at high level 1, the booster clock frequency is decremented by one level. When both the boosting ratio control flag A and the booster clock frequency control flag B are at low level 0, the booster clock frequency is incremented by one level. When the booster clock frequency reaches the maximum, however, the boosting ratio is enhanced by one level, instead.

The boosting ratio may be controlled in a manner similar to the first embodiment. The booster clock frequency is controlled by adjusting a booster clock generator circuit shown in FIG. 7. Alternatively, the frequency may be controlled by changing a division ratio of a frequency divider circuit although it requires a high oscillating frequency.

In FIG. 7, a booster clock generator circuit includes inverters 51 and 52 which are connected in series. The output of the inverter 52 is positively fed back to the input of the inverter 51 via a capacitor 54. The output of the inverter 52 is negatively fed back to the input of the inverter 51 via an inverter 53 and resistors $R_1$ to $R_8$ connected in series to one another. The thus constructed components form a CR oscillator. Switching circuits $S_1$ to $S_7$ are connected so that portions of the resistors $R_1$ to $R_8$ may be short-circuited, and the oscillating frequency of the CR oscillator may be changed based on the conditions of these switching circuits. FIG. 8 shows a specific example of a switching circuit.

Here, suppose a standard state in which only a control signal $EN_0$ supplied to the switching circuit $S_4$ is active. In this state, the switching circuit S4 causes the resistors $R_1$ to $R_4$ to be shorted, with the oscillating frequency being set at the standard value. Now, if a control signal $EN_3$ P supplied to the switching circuit $S_7$ is active, the resistors $R_1$ to $R_7$ are shorted, with the oscillating frequency being the maximum. If no control signal is active, on the other hand, none of the resistors is shorted, with the oscillating frequency being the minimum.

Now, a third embodiment of the present invention is described. In the present embodiment, the potential difference $V_C$ between the both ends of the capacitor 6 shown in FIG. 2 is compared with three predetermined voltages $V_{REF}1$, $V_{REF}2$, and $V_{REF}3$ in a time-division manner by a comparator 7 shown in FIG. 9. Here, for example, suppose that $V_{REF}1=V_{DD}-V_{SS}$ with $V_{REF}1>V_{REF}2>$ (the desired margin voltage) $>V_{REF}3$. Serial/parallel conversion is performed on the output of the comparator 7 to yield individual flags A, B, and C as comparison results.

In order to switch among the three reference voltages, switching circuits S11, S12, and S13, each being similar to the one shown in FIG. 8, are incorporated. Also incorporated are flip-flops 61 to 64, which converts the output of the comparator 7 from serial to parallel. To these switching circuits and flip-flops, control clock signals $\phi_2$ to $\phi_6$ as depicted in FIG. 10 are supplied.

The flags A and B are forwarded as inputs to a NOR gate 65, and the flag C is forwarded as an inverting input to the NOR gate 65. The output of the NOR gate 65 is then forwarded as an inverting input to ENABLE input of an up-down counter 66 having a LOAD input as well as the ENABLE input. The up-down counter 66 is operated in accordance with the clock signals indicated by barred $\phi_6$. When the flags A and B are at low level 0 and the flag C is at high level 1, the up-down counter 66 stops counting, so that the boosting ratio and the booster clock frequency are maintained.

In association with each of the outputs of the up-down counter 66, there are provided inverters, respectively, 67 to 70. The non-inverted and inverted outputs of the up-down counter 66 are fed to AND gates 71, 72, etc., so that one of the booster clock frequency control signals, $EN_{3M}$, $EN_{2M}$, etc., to be supplied to a booster clock generator circuit such as the one shown in FIG. 7, is asserted.

The flag A is forwarded and the control clock signals $\phi_6$ are supplied to an AND gate 73 as inputs thereto, and the flag C is forwarded and the CARRY output of the up-down counter 66 is fed to an AND gate 74 as inverting inputs thereto. The outputs of the AND gates 73 and 74 are input to a NOR gate 75. The output of the NOR gate 75 is then fed to a CLOCK input of an up-down counter 76 having a LOAD input.

In association with each of the outputs of the up-down counter 76, there are provided inverters, respectively, 77 and 78. The non-inverted and inverted outputs of the up-down counter 76 are fed to AND gates 79 to 81, so that one of the boosting ratio control signals X1 to X3, which gates booster clock signals to be supplied to a booster circuit such as the one shown in FIG. 14, is asserted.

FIG. 11 shows the specific control operations. If all the flags A, B, and C are at high level 1, the boosting ratio is decremented by one level. If the flag A is at low level 0 and the flags B and C are at high level 1, the booster clock frequency is decremented by one level. If the flags A and B are at low level 0 and the flag C is at high level 1, the current status is maintained. If all the flags A, B, and C are at low level 0, the booster clock frequency is incremented by one level. If the booster clock frequency is already at the maximum level, however, the boosting ratio is instead incremented by one level.

Next, the configuration of capacitors in a power supply circuit according to one embodiment of the present invention will be described. As previously described with reference to FIGS. 17 A and B, stray capacitances $C_S$ are present between the semiconductor substrate and the lower electrodes of capacitors fabricated thereon.

The configuration of capacitors in this embodiment equivalently reduces such stray capacitances. As shown in FIGS. 12 A and B, the capacitors are fabricated in fragments on a semiconductor substrate. The fragmented capacitors are arranged in a checkered pattern formed of a first capacitor group $C_A$ and a second capacitor group $C_B$. The numbers of capacitors included in the first and second capacitor groups $C_A$ and $C_B$ are, respectively, M and N, both being natural numbers. The capacitor groups $C_A$ and $C_B$ operate in the opposite phase from each other.

Accordingly, potentials within the semiconductor substrate, caused by capacitor currents, are cancelled. This is equivalent to a series connection of $C_S \cdot M$ and $C_S \cdot N$, representing the sums of fragmented capacitances for each capacitor group. Thus, the equivalent stray capacitance is expressed by $C_S \cdot M \cdot N/(M+N)$. Supposing M=N, the equivalent stray capacitance is $C_S \cdot N/2$; i.e., the equivalent stray capacitance is reduced to half compared with a typical case where the stray capacitances are in parallel connection with each other. In addition, stray capacitances incidental to transistors in a booster circuit such as the one shown in FIG. 14 can be reduced by arranging the transistors so that adjacent transistors operate in the opposite phase from each other.

As described above, according to the present invention, even when the display mode or display content is changed, a margin for the boosted voltage is detected. Thus, power consumption can be reduced by either adjusting the frequency of clock signals or fixing at least one of the clock signals, which controls a switching component.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A DC-DC voltage boosting method, comprising the steps of:
    (a) boosting an input voltage by using clock signals and generating a boosted voltage;
    (b) generating a stabilized operating voltage with a voltage regulator by using said boosted voltage;
    (c) detecting a margin voltage between said boosted voltage and said operating voltage; and
    (d) based on the detected result in step (c), adjusting the frequency of the clock signals used in step (a) or fixing at least one of the clock signals which controls switching components.

2. A DC-DC voltage boosting method according to claim 3, wherein step (d) includes the step of changing the boosting ratio of the input voltage in step (a) by fixing at least one of the clock signals used in step (a), which control switching components.

3. A DC-DC voltage boosting method according to claim 2,
    wherein step (c) includes the step of comparing said margin voltage to a first predetermined voltage and a second predetermined voltage; and
    wherein step (d) includes the steps of bringing the boosting ratio down by one level when said margin voltage is higher than the first predetermined voltage, bringing the frequency of the clock signals down by one level when said margin voltage is lower than the first predetermined voltage but higher than the second predetermined voltage, and bringing the frequency of said clock signals up by one level or the boosting ratio up by one level when said margin voltage is lower than the second predetermined voltage.

4. A DC-DC voltage boosting method according to claim 2,
    wherein step (c) includes the step of comparing said margin voltage to first, second and third predetermined voltages; and
    wherein step (d) includes the step of bringing the boosting ratio down by one level when said margin voltage is higher than the first predetermined voltage, bringing the frequency of the clock signals down by one level when said margin voltage is lower than the first predetermined voltage but higher than the second predetermined voltage, maintaining the boosting ratio and the frequency of the clock signals when said margin voltage is lower than the second predetermined voltage but higher than the third predetermined voltage, and bringing the frequency of the clock signals up by one level or the boosting ratio up by one level when said margin voltage is lower than the third predetermined voltage.

5. A power supply circuit, comprising:
    a booster circuit to which an input voltage is supplied and which boosts the input voltage by using clock signals to generate a boosted voltage;

a voltage regulator circuit which generates a stabilized operating voltage by using the boosted voltage generated by said booster circuit;

a detector circuit for detecting a margin voltage between the boosted voltage generated by said booster circuit and the operating voltage generated by said voltage regulator circuit; and a booster clock adjuster circuit which, based on the detected result from said detector circuit, adjusts the frequency of the clock signals used by said booster circuit or fixes at least one of the clock signals which control switching components.

6. A power supply circuit according to claim 5, wherein said booster clock adjuster circuit changes the boosting ratio of the input voltage in said booster circuit by fixing at least one of the clock signals used by said booster circuit, which control switching components.

7. A power supply circuit according to claim 5, wherein said detector circuit compares said margin voltage to a first predetermined voltage and a second predetermined voltage; and wherein said booster clock adjuster circuit which adjusts the amplitude or the frequency of the clock signals brings the boosting ratio down by one level when said margin voltage is higher than the first predetermined voltage, brings the frequency of the clock signals down by one level when said margin voltage is lower than the first predetermined voltage but higher than the second predetermined voltage, and brings the frequency of the clock signals up by one level or the boosting ratio up by one level when said margin voltage is lower than the second predetermined voltage.

8. A power supply circuit according to claim 6, wherein said detector circuit compares said margin voltage to first, second and third predetermined voltages; and wherein said booster clock adjuster circuit which adjusts the amplitude or the frequency of the clock signals brings the boosting ratio down by one level when said margin voltage is higher than the first predetermined voltage, brings the frequency of the clock signals down by one level when said margin voltage is lower than the first predetermined voltage but higher than the second predetermined voltage, maintains the boosting ratio and the frequency of the clock signals when said margin voltage is lower than the second predetermined voltage but higher than the third predetermined voltage, and brings the frequency of the clock signals up by one level or the boosting ratio up by one level when said margin voltage is lower than the third predetermined voltage.

9. A power supply circuit according to claim 5, further comprising a booster clock generating circuit for generating and supplying to said booster circuit variable frequency clock signals, said booster clock generating circuit including: a capacitor; a plurality of resistors; and a plurality of switching circuits which switch the connections of said plurality of resistors corresponding to a plurality of control signals output from said booster clock adjuster circuit.

10. A power supply circuit according to claim 5, wherein at least one capacitor whose the upper electrode and the lower electrode are impressed with the signals in a first phase and at least one capacitor whose the upper electrode and the lower electrode are impressed with the signals in a second phase which is opposite of the first phase are included in said booster circuit and are arranged in M-by-N checkered pattern (M and N are natural numbers) on a semiconductor substrate.

* * * * *

UNITED STATES PATENT AND TRADEMARK OFFICE
CERTIFICATE OF CORRECTION

PATENT NO. : 6,459,330 B2
DATED : October 1, 2002
INVENTOR(S) : Tadashi Yasue

It is certified that error appears in the above-identified patent and that said Letters Patent is hereby corrected as shown below:

<u>Column 10,</u>
Line 26, please change "3" to -- 1 --.

Signed and Sealed this

Fourth Day of February, 2003

JAMES E. ROGAN
*Director of the United States Patent and Trademark Office*